United States Patent
Ewert (10) Patent No.: US 11,946,746 B2
(45) Date of Patent: Apr. 2, 2024

(54) METHOD FOR SATELLITE-BASED DETECTION OF A VEHICLE LOCATION BY MEANS OF A MOTION AND LOCATION SENSOR

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 799 days.

(21) Appl. No.: 16/401,953

(22) Filed: May 2, 2019

(65) Prior Publication Data
US 2019/0339083 A1 Nov. 7, 2019

(30) Foreign Application Priority Data
May 3, 2018 (DE) .................. 10 2018 206 786.4

(51) Int. Cl.
| | | |
|---|---|---|
| G01C 21/30 | (2006.01) | |
| G01C 21/16 | (2006.01) | |
| G01S 19/49 | (2010.01) | |
| G06N 3/08 | (2023.01) | |

(52) U.S. Cl.
CPC .......... *G01C 21/30* (2013.01); *G01C 21/165* (2013.01); *G01S 19/49* (2013.01); *G06N 3/08* (2013.01)

(58) Field of Classification Search
CPC ...... G01C 21/32; G01C 21/165; G01C 21/28; G06N 3/08; G01S 19/49; G01S 19/52; G01S 19/53; G01S 19/41; G01S 19/45; G01S 19/47; G01S 19/50
See application file for complete search history.

(56) References Cited

U.S. PATENT DOCUMENTS

| | | | | |
|---|---|---|---|---|
| 2006/0253248 A1* | 11/2006 | Ames | .................. | G01C 21/26 701/408 |
| 2008/0228395 A1* | 9/2008 | Kobori | .................. | G01S 19/48 701/8 |
| 2009/0030605 A1* | 1/2009 | Breed | .................. | G08G 1/167 701/532 |
| 2011/0106487 A1* | 5/2011 | Kourogi | .................. | G01C 21/00 702/142 |
| 2012/0116676 A1* | 5/2012 | Basnayake | .................. | G01C 21/30 701/469 |
| 2012/0303176 A1* | 11/2012 | Wong | .................. | G01S 17/89 701/1 |

(Continued)

FOREIGN PATENT DOCUMENTS

| | | |
|---|---|---|
| CN | 101360971 A | 2/2009 |
| CN | 103250196 A | 8/2013 |

(Continued)

*Primary Examiner* — Faris S Almatrahi
*Assistant Examiner* — Abdalla A Khaled
(74) *Attorney, Agent, or Firm* — Maginot, Moore & Beck LLP (57) ABSTRACT

A method for satellite-based detection of vehicle location uses a motion and location sensor. GNSS data is received as an input variable, at least one further input variable is also received. Weighting factors for the input variable and the at least one further input variable are determined. The input variable and the at least one further input variable are weighted by the weighing factors. The vehicle location is detected via the weighted input variable and the weighted at least one further input variable.

15 Claims, 2 Drawing Sheets

(56) References Cited

U.S. PATENT DOCUMENTS

| | | | | |
|---|---|---|---|---|
| 2013/0293395 A1* | 11/2013 | Ohama | ............... | G08G 1/166 |
| | | | | 340/904 |
| 2015/0354966 A1* | 12/2015 | Morin | ............... | G01S 11/12 |
| | | | | 701/468 |
| 2016/0146616 A1* | 5/2016 | Ren | ............... | G01C 21/165 |
| | | | | 701/409 |
| 2018/0095476 A1* | 4/2018 | Madsen | ............... | G05D 1/027 |
| 2018/0136000 A1* | 5/2018 | Rasmusson, Jr. | ............... | G05D 1/0274 |
| 2018/0136665 A1* | 5/2018 | Mudalige | ............... | G05D 1/0248 |
| 2019/0265365 A1* | 8/2019 | Skupin | ............... | G01S 19/49 |
| 2020/0041285 A1* | 2/2020 | Kato | ............... | G09B 29/007 |

FOREIGN PATENT DOCUMENTS

| | | |
|---|---|---|
| JP | H11-257982 A | 9/1999 |
| JP | 2016-80460 A | 5/2016 |

* cited by examiner

METHOD FOR SATELLITE-BASED DETECTION OF A VEHICLE LOCATION BY MEANS OF A MOTION AND LOCATION SENSOR

This application claims priority under 35 U.S.C. § 119 to patent application no. DE 10 2018 206 786.4, filed on May 3, 2018 in Germany, the disclosure of which is incorporated herein by reference in its entirety.

The disclosure relates to a method for satellite-based detection of a vehicle location by means of a motion and location sensor, a computer program, a machine-readable storage medium and a motion and location sensor. The disclosure is suitable, in particular, for use in autonomous driving.

BACKGROUND

An autonomous vehicle is a vehicle which does not require a driver. The vehicle here drives autonomously by, for example, automatically detecting the profile of the road, other road users or obstacles and calculating the corresponding control commands in the vehicle and passing them on to the actuators in the vehicle, by which means the driving profile of the vehicle is correctly influenced. In the case of a fully autonomous vehicle, the driver is not involved in the driving events.

Inter alia, a vehicle for autonomous operation requires a sensor system which is able to detect a high-precision vehicle location, in particular using navigation satellite data (GPS, GLONASS, Beidou, Galileo). For this purpose, at present GNSS (global navigation satellite system) signals are received via a GNSS antenna on the roof of the vehicle and processed by means of a GNSS sensor. In this case, in addition GNSS correction data can be taken into account in order to improve the locating result. Particularly advantageous GNSS sensors are what are referred to as motion and location sensors which can use GNSS data to detect at least one vehicle location or a vehicle orientation or vehicle motion.

For the calculation of a high-precision vehicle location in a motion and location sensor, inter alia a Kalman filter is used. Until now, the following input variables have been input into this filter:
GNSS data,
GNSS correction data,
data from acceleration and rotational speed sensors,
inertial sensor data,
wheel speeds,
steering angle,
vehicle speed,
direction of travel.

Within the Kalman filter, these input variables are weighted dynamically with respect to their influence on the instantaneous location calculation. In the case of cornering, for example the data from acceleration sensors and rotational speed sensors are given a higher weighting than, for example, the GNSS data. In further scenarios, conversely the GNSS data are given a higher weighting than the acceleration data and rotational speed data. This dynamic weighting of the input variables for the high-precision location calculation is particularly advantageous for the precision of the location calculation. The estimation of the instantaneous driving maneuver is highly significant here. The aim is to improve the estimation of the weighting factors.

SUMMARY

According to the disclosure, a method is proposed here for satellite-based detection of a vehicle location by means of a motion and location sensor, comprising the following steps:
a) receiving GNSS data as an input variable,
b) receiving at least one further input variable,
c) determining weighting factors for the input variables using map data,
d) weighting the input variables received in step a) and b), with the weighting factors determined in step c),
e) detecting the vehicle location using the input variables received in step a) and b) and weighted in step d).

The method serves, in particular, for satellite-based detection of a vehicle location of the vehicle in question by means of a motion and location sensor. The vehicle in question is preferably an autonomous vehicle, in particular an autonomously operating automobile. The solution proposed here is based, in particular, on the concept of using map data in a Kalman filter of motion and location sensor in order advantageously to improve the detection of the vehicle location. The use of map data contributes in a particularly advantageous way here to permitting predictive weighting to occur. If it can be inferred from map data, for example, that the vehicle is moving toward a street canyon and/or a tunnel, the influence of the GNSS data from the location determination can be given a lower weighting in comparison with the influence of alternative locating data, in particular for the (future) time period in which the vehicle is, or is expected to be, located in the street canyon or the tunnel.

GNSS stands for global navigation satellite system. GNSS is a system for determining locations and/or for navigating on the earth and/or in the air by receiving signals from navigation satellites, referred to here as satellite data. GNSS is here a collective term for the use of existing and future global satellite systems, such as GPS (NAVSTRAR GPS), GLONASS, Beidou and Galileo. A GNSS sensor is thus a sensor system which is suitable for receiving navigation satellite data and processing them, for example evaluating them. Preferably, the GNSS sensor is able to detect a high-precision vehicle location using navigation satellite data (GPS, GLONASS, Beidou, Galileo). GNSS data are, in particular, data which are received by a navigation satellite, and GNSS data can also be referred to as "navigation satellite data".

In step a), GNSS data are received as an input variable. This means in other words, in particular, that the received GNSS data constitute a type of input variable. For example, the GNSS data are here an input variable of the motion and location sensor. In step a), GNSS satellite data are preferably received. In this context, transit time measurements of navigation satellite signals can be carried out. The motion and location sensor preferably receives the GNSS data or GNSS satellite data from, in particular, at least one GNSS receiver unit (of the vehicle), for example a GNSS antenna, which itself communicates (directly) with the navigation satellites and receives the satellite signals (directly). The motion and location sensor can itself be embodied in the manner of a GNSS sensor or comprise this sensor. Alternatively or additionally, the motion and location sensor can receive GNSS data from a GNSS sensor (of the vehicle). In this context, the GNSS sensor evaluates the received GNSS satellite signals and passes on GNSS data, for example GNSS location data or GNSS vehicle locations, to the motion and location sensor.

In step b), at least one further input variable is received. This means, in other words, in particular, that the input variable received in step b) differs from the input variable received in step a). In other words, step b) involves, in particular, a different type of input variable than step a). The at least one further input variable is preferably (also) an input variable of the motion and location sensor or are received by the latter.

In step c), weighting factors are determined for the input variables (received in step a) and b)) using map data. As a rule, the weighting factors are allocated or assigned to the input variables in the process or subsequently. In particular, for each input variable a (separate) weighting factor is determined and/or allocated thereto. For example, for the GNSS data a weighting factor k1 can be determined, and for exemplary inertial sensor data (as a further input variable) a weighting factor k2 can be determined. For the purpose of the weighting, the GNSS data can then be multiplied, for example, by the weighting factor k1, and the inertial sensor data by the weighting factor k2.

The weighting factors are preferably determined in or with the motion and location sensor of the vehicle. Alternatively or additionally, the weighting factors, or at least some of the weighting factors, can be determined by an at least central or superordinate processing device (Cloud). The weighting factors are preferably determined and/or changed, in particular, independently of where they are determined, during the (normal), in particular autonomous, operation ("online") or during the ongoing, in particular autonomous, driving operation of the vehicle. The weighting factors are particularly preferably determined and/or changed predictively during the (normal), in particular autonomous, operation or during the ongoing, in particular autonomous, driving operation of the vehicle.

The weighting factors are determined using map data. The weighting factors are preferably determined as a function of map data or information from the map data. Map data are understood here to be, in particular, data (from) a digital map. The weighting factors are preferably determined using map data (from) a digital map and/or from a map control unit (MAP control unit). The digital map can make available, for example, information about streets and/or infrastructure points such as, for example, buildings, signaling systems, tunnels and the like, in particular about their location and spatial extent (length, width, height). An item of information which can be used to determine the weighting factors from such a digital map, for example, can be such that a low, medium or high degree of shadowing of the GNSS signal is to be expected at the location toward which the vehicle is moving. Accordingly, the weighting factor k1 for the GNSS data can be selected or determined as being high (e.g. 0.7) when there is a low degree of shadowing, medium (e.g. 0.5) when there is a medium degree of shadowing, and low (e.g. 0.1) when there is a high degree of shadowing, for example. Map data can be understood here to be surroundings-specific data, in particular data which can be displayed on a digital map or which are displayed and/or made available on a digital map. For example, road profiles, infrastructure points, such as, for example buildings, signaling systems, tunnels and the like, other road users, such as, for example other vehicles, and weather information, can be displayed and/or made available on a digital map.

The map data may involve, for example, one or more of the following data items, which can preferably additionally be fed (as additional input variables) into, in particular, the motion and location sensor, for example from a map control unit (MAP control unit) or from surroundings sensors:

Trajectory data of a road map on which the autonomous vehicle is moving at a particular time. These data can contain, inter alia, the road profile and/or the number of lanes and/or the type of road (freeway, country road, dirt road etc.).

Data of a feature map, such as, for example, building structures, height of buildings, forest regions, etc.

Position, size and location of further road users within an, in particular (pre)defined, minimum distance around the vehicle in question. These data originate, for example, from the evaluation of surroundings sensors of the (autonomous) vehicle.

These data can be additionally read or input (as additional input variables) into the motion and location sensor in a raw or preprocessed form. The map data are preferably used there within a Kalman filter in order to perform and/or improve the weighting of the input variables during the location calculation.

In step d), weighting of the input variables received in step a) and b) is carried out with the weighting factors determined in step c). This means in other words, in particular, that the weighting factors determined in step c) are included in the weighting of the input variables received in step a) and b). For this purpose, for example weighting factors which are already present (initial weighting factors or ones originating from a preceding determination) can be modified or adapted in accordance with the determination in step d). The weighting is preferably carried out in or with the motion and location sensor of the vehicle. The weighting is particularly preferably carried out in or with a Kalman filter of the weight and location sensor.

The GNSS data received in step a) and the at least one further input variable received in step b) are as a rule provided with a time stamp or advantageously already have one. In step d), the GNSS data and further input variables which have the same time stamp are generally weighted with respect to one another.

For example, the influence of a GNSS sensor during journeying through a tunnel or when passing by high building structures or a wooded area can be minimized or reduced with respect to the further input variables. The further input variables, such as for example acceleration sensor data and rotational speed sensor data, wheel speeds and/or steering angles, are provided in this case with a higher weighting, in particular within the Kalman filter. Moreover, for example the influence of the acceleration sensors and rotational speed sensors during straight-ahead travel on a freeway without surrounding building structures can be minimized, while the influence of the GNSS-based data is increased, in particular within the Kalman filter (of the motion and location sensor).

In step e), the vehicle location is detected using the input variables received in step a) and b) and weighted in step d). This means in other words, in particular, that the detection of the vehicle location is carried out using the input variables (with the same time stamp) which were previously weighted with respect to one another. The detection is preferably carried out in or with the motion and location sensor of the vehicle. The input variables received in step a) and b) and weighted in step d) are preferably processed in or with the motion and location sensor to form the vehicle location.

According to one advantageous refinement it is proposed that in step b) at least one of the following further input variables is received:

GNSS correction data,
data from acceleration and rotational speed sensors,
inertial sensor data,
wheel speeds,
steering angle,
vehicle speed,
direction of travel.

These data or variables are preferably made available to the motion and location sensor by a corresponding sensor of the vehicle. The GNSS correction data can be made available by a GNSS antenna and/or via a car-to-X communication link. The inertial sensor data can be made available with an inertial measuring unit (IMU) or an inertia sensor. The vehicle speed and/or direction of travel can be calculated for example within the motion and location sensor, e.g. from previously determined locations. Alternatively or additionally, the vehicle speed and/or direction of travel can be determined using wheel speeds within the motion and location sensor. These can then be received or read in, for example, as an input variable by a Kalman filter of the motion and location sensor.

The at least one further input variable particularly preferably comprises at least inertial sensor (IMU) data or data from acceleration sensors and rotational speed sensors. These are particularly advantageously suitable for predictive weighting (explained below), in particular for predictive weighting to form GNSS data. This means in other words, in particular, that predictive weighting of the components of the GNSS sensor system and the IMU sensor system can occur, in particular, in the Kalman filter in a particularly advantageous way.

According to one advantageous refinement it is proposed that predictive weighting occurs. The weighting factors are preferably determined predictively and/or changed or adapted predictively (in accordance with the (predictive) determination in step c)). The weighting factors are particularly preferably determined predictively during the (normal), in particular autonomous, operation or during the ongoing, in particular autonomous, driving operation of the vehicle and/or modified (in accordance with the (predictive) determination in step c)). For the predictive weighting it is possible to use all the information which is already available in advance of the determination of a location. This information includes, for example, data about the steering angle and speed which permit an estimation as to where the vehicle will be at a point in time in the (near) future. This equally includes map data which, together with a current location, also make it possible to make a corresponding prediction.

The weighting factors are preferably determined (during the driving operation of the vehicle) as a function of an expected surroundings scenario, in particular before the input variables are received (in this surroundings scenario). This means in other words, in particular, that the weighting factors are determined for input variables which are (expected) to be received or are received in the future. The expected surroundings scenario is particularly affected by map data which are present at a location toward which the vehicle is moving.

The weighting factors are preferably determined using or as a function of map data relating to a location toward which the vehicle is moving. Furthermore, the weighting factors are preferably modified or adapted (immediately) before this location is reached or passed, or a point on the map which was decisive for the determination in step c) is reached or passed (said point corresponding to the determination in step c)). As a rule, the weighting factors are then included in a correspondingly modified or adapted fashion in the weighting of the input variables which have been received for this location and/or have been detected at this location.

For example, the weighting of the input variables or the determination of the weighting factors can take place predictively using trajectory data of a road map on which the (autonomous) vehicle is traveling at that particular time. In this context, for example (upcoming) cornering can already be detected in advance, and therefore the influence of the acceleration sensors and rotational speed sensors (within the Kalman filter) can be increased in good time, for example immediately before the cornering itself occurs.

According to one advantageous refinement it is proposed that the weighting occurs by means of a Kalman filter. The Kalman filter is preferably formed or provided within the motion and location sensor.

The map data are preferably received before step c). The motion and location sensor of the vehicle preferably receives the map data. For this purpose, the map data can be made available to the motion and location sensor, for example, by a map control unit (of the vehicle). Alternatively or additionally there can be provision that an at least central or superordinate processing device receives the map data. The map data can be made available to said processing device by a map control unit of the vehicle or at least of a vehicle and/or by a vehicle-external map service.

According to one advantageous refinement it is proposed that the map data comprise at least data of a (digital) road map or data of a (digital) feature map. The road map can make available, for example, information about road profiles. The feature map can make available, for example, information about infrastructure points such as, for example, buildings, signaling systems, tunnels and the like, in particular about their location and spatial extent (length, width, height).

According to one advantageous refinement, it is proposed that the map data comprise at least the position, size location of further road users within a minimum distance around the vehicle in question. The minimum distance is preferably a (pre)defined minimum distance. For this purpose, for example adjacent vehicles can transmit information about their position, size (e.g. (external) dimensions)) and/or location to a map control unit of the vehicle in question via a car-to-X communication link.

According to one advantageous refinement it is proposed that the map data are made available in a preprocessed form. The map data are preferably input in preprocessed form into a Kalman filter (of the motion and location sensor). For example, preprocessing of the map data can occur within the motion and location sensor or, in particular, on a further device, such as, for example, a map control unit, for reasons of computing capacity. In this context, information for the weighting (weighting information) or weighting factors for the input data can be determined separately on the basis of the map data and, in particular, only then input into the Kalman filter. The Kalman filter can as a result be advantageously made thinner, in particular since the weighting functions or weighting factors are determined, in particular calculated, outside. In particular, in this case the Kalman filter is responsible only for the fusion, for example of the input variables with the corresponding weightings or weighting factors.

According to one advantageous refinement it is proposed that the weighting factors are determined by an at least central or superordinate processing device. The central and/or superordinate processing device can be formed in the manner of what is referred to as a Cloud. The instantaneous vehicle position is preferably transmitted to the central and/or superordinate processing device via a car-to-X communication link. Within said processing device, which has sufficient computing capacities, the weighting factors can then be determined for the input variables (for the Kalman filter of the motion and location sensor of the vehicle). The determination can be carried out, for example, using the map data which have already been mentioned.

After the determination of the weighting factors by the central and/or superordinate processing device, these weighting factors can be transmitted back (in real time) into the motion and location sensor, in particular via a car-to-X communication link, for example via a vehicle gateway. The motion and location sensor can then detect its position (with high precision) in the world by using these weighting factors from the processing device. As a result, a Kalman filter of the motion and location sensor can advantageously be made (even) thinner, and/or it is possible to achieve a saving in terms of resources in the motion and location sensor.

Alternatively or additionally, the central and/or superordinate processing device can be equipped with what is referred to as a look-up table which is preferably updated cyclically (at specific intervals). In this look-up table it is possible to store how specific input variables of a motion and location sensor are to be weighted at a specific vehicle location for the calculation of a location. For this purpose, particularly preferably weighting factors are stored (in a location-specific fashion) in the look-up table, said weighting factors having been determined using the map data. The look-up table is (also) preferably updated on the basis of weather data, building structures and/or road changes (map data and/or changes thereto).

The look-up table preferably contains (only) comparatively rough weighting factors for a location and/or takes into account (only) static map data, for example structures such as buildings or tunnels. This may be sufficient, for example, insofar as only the trajectory and/or surrounding structures are used in the detection of the weighting. However, if further road users are also taken into account (dynamically), it is particularly preferred that the comparatively rough weighting factors of the look-up table be refined with the (with all) the vehicle locations and/or spatial vehicle extents of the further road users within the minimum distance around the vehicle in question in the Cloud or on the vehicle (at the vehicle end, in particular by means of the motion and location sensor), wherein the comparatively rough weighting factors preferably originate from the Cloud look-up table. The look-up table therefore preferably covers static map data such as structures or features. By, for example, multiplying these look-up table weighting factors with factors which have been detected on the basis of the other road users, the ultimate weighting factors can be determined. The vehicle, in particular the motion and location sensor, preferably carries out this multiplication locally or transfers the ultimate weighting factors from the Cloud.

According to one advantageous refinement it is proposed that the weighting factors are transmitted (back) to the vehicle via a car-to-X communication link or according to this standard. The motion and location sensor preferably receives the weighting factors via the car-to-X communication link or according to this standard, in particular from the central and/or superordinate processing device, in particular via one or more receiver units, in particular antennas of the vehicle and/or via other road users and/or infrastructure devices. Car-to-car communication, or in abbreviated form Car2Car or C2C, is understood to mean the exchange of information and data between (motor) vehicles. The object of this exchange of data is to signal critical and hazardous situations to the driver early. The respective vehicles collect data such as ABS interventions, steering angles, location, direction and speed, and transmit this data by radio (WLAN, UMTS etc.) to the other road users. In this context, the intention is that the "viewing range" of the driver will be extended with electronic means. Car-to-infrastructure, or for short C2I, is understood to mean the exchange of data between a vehicle and the surrounding infrastructure (e.g. sets of traffic lights). The specified technologies are based on the interaction of sensors of the various road users and use the latest methods of communication technology for exchanging this information. Car-to-X is understood here to be a generic term for the various communication links such as car-to-car and car-to-infrastructure.

According to one advantageous refinement it is proposed that in step e) fusing of the input variables which are received in step a) and b) and weighted in step d) is carried out by means of a Kalman filter. The Kalman filter is preferably stored in the motion and location sensor.

According to one advantageous refinement it is proposed that the detection in step e) is carried out by means of an (artificial) neural network with weighting. The neural network can be embodied in the manner of an algorithm which adapts itself in an automated fashion or is self-learning. In this context, an approach is preferably adopted which is based on artificial intelligence (AI) methods or uses said methods. This means in other words, in particular, that the algorithm makes available the detection of the vehicle location by using an artificial intelligence (AI). It is possible to use as input data into this neural network (inter alia) one or more of the input variables described above and/or the map data.

The neural network or the AI preferably uses the above input variables (received in steps a) and b)) and the map data as inputs and calculates the vehicle location using learnt weightings within the network or the AI. At least one weighting of the neural network is particularly preferably adapted in step c). The neural network or the AI preferably uses map data for setting or adapting the (internal) weightings. The neural network or the AI particularly preferably learns at least some of its weightings on the basis of map data.

In one particularly advantageous embodiment, the Kalman filter is embodied as artificial intelligence (AI), preferably as a neural network. The location determination is preferably carried out here on the basis of the map data and the GNSS data (received in step a)) and the at least one further input variable (received in step b)). A separate and/or explicit determination of the weighting factors for the input variables is not absolutely necessary in this case, since the AI or the neural network can model the weighting internally itself, in particular by means of the learnt weightings. This means in other words, in particular, that the AI or the neural network implicitly determines the weighting factors, and/or that the internal weightings of the AI or of the neural network constitute and/or can comprise weighting factors according to the solution presented here. The internal weightings of the AI can be learnt in advance with the relevant input data and as many as scenarios as possible. The AI obtains for this purpose, in particular, the following variables as (relevant) input data:

GNSS data as an input variable (received in step a)),
at least one further input variable (received in step b)), and
map data.

On the basis of these input data, the AI can detect the (precise) vehicle location using the GNSS data, the at least one further input variable and the map data (taking into account the internal weightings). This embodiment provides the particular advantage that the determination of the weighting factors is modeled within the AI itself, and therefore the AI also implicitly contains the weighting function of the input variables for the modeling of the Kalman filter.

According to a further aspect, a computer program for carrying out a method as presented here is proposed. This relates in other words, in particular, to a computer program (product) comprising commands which during the execution of the program by a computer cause said computer to execute a method described here.

According to a further aspect, a machine-readable storage medium is proposed on which the computer program proposed here is stored. The machine-readable storage medium is generally a computer-readable data carrier.

According to a further aspect, a motion and location sensor is proposed, configured to carry out a method as proposed here. For example, the storage medium described above can be a component of the motion and location sensor or be connected thereto. The motion and location sensor is preferably arranged in or on the vehicle or provided and configured for mounting in or on such a vehicle. The motion and location sensor is also preferably provided and configured for autonomous operation of the vehicle, in particular of an automobile. The motion and location sensor or a computing unit (processor) of the motion and location sensor can access, for example, the computer program described here, in order to execute a method as described here.

The motion and location sensors are preferably a GNSS sensor. The motion and location sensor can be a location and orientation sensor. Furthermore, the GNSS sensor can be configured as a GNSS-based location and orientation sensor. GNSS or (vehicle) motion and location sensors are required for automated or autonomous driving and calculate a high-precision vehicle location using navigation satellite data (GPS, GLONASS, Beidou, Galileo), which are also referred to as navigation satellite system data or GNSS data. The calculation is based here essentially on a transit time measurement of the (electromagnetic) GNSS signals of at least four satellites. Moreover, correction data of what are referred to as correction services in the sensor can also be used to calculate the position of the vehicle even more precisely. Together with the received GNSS data, a high-precision time (such as universal time) is generally also read into the sensor and used for the precise determination of locations. Further input data input into the location sensor can be (inter alia) wheel speeds, steering angles and acceleration data and rotational speed data. The motion and location sensor is preferably configured to detect its own location, own orientation and/or own speed on the basis of GNSS data.

The details, features and advantageous refinements which are mentioned in conjunction with the method for satellite-based detection of a vehicle location can correspondingly also occur in the method presented here for improving the estimation of the precision of a vehicle location which is detected in a satellite-based fashion, the motion and location sensor, the computer program and/or the storage medium, and vice versa. In this respect, reference is made to the entire scope of the statements made there for the more detailed characterization of the features.

BRIEF DESCRIPTION OF THE DRAWINGS

The solution presented here and the technical field thereof are explained in more detail below with reference to the figures. It is to be noted that the disclosure is not to be limited by the exemplary embodiments shown. In particular, unless explicitly stated otherwise, it is also possible to extract partial aspects of the contents explained in the figures and to combine with other components and/or realizations from other figures and/or the present description. In the drawing.

DETAILED DESCRIPTION

Figure 1:
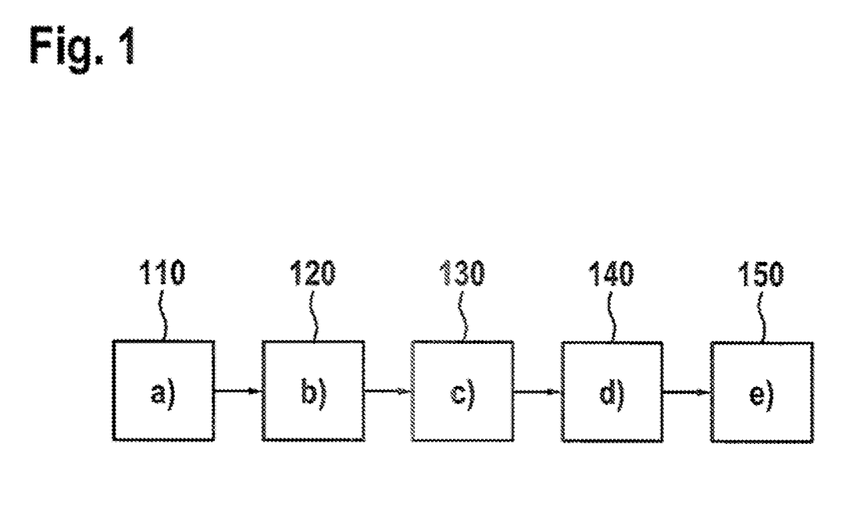
FIG. 1 shows a schematic sequence of a method presented here for satellite-based detection of a vehicle location by means of a motion and location sensor during a usual operating sequence.

FIG. 1 illustrates schematically a sequence of a method presented here for satellite-based detection of a vehicle location by means of a motion and location sensor during a usual operating sequence. The illustrated order of the method steps a), b), c), d) and e) with the blocks 110, 120, 130, 140 and 150 is merely exemplary. In block 110, GNSS data are received as an input variable. In block 120 at least one further input variable is received. In block 130 weighting factors are determined for the input variables using map data. In block 140 weighting of the input variables received in step a) and b) is carried out with the weighting factors determined in step c). In block 150, the vehicle location is detected using the input variables received in step a) and b) and weighted in step d).

In particular, the method steps a) and b) or d) and e) can also proceed at least partially in parallel or simultaneously.

Figure 2:
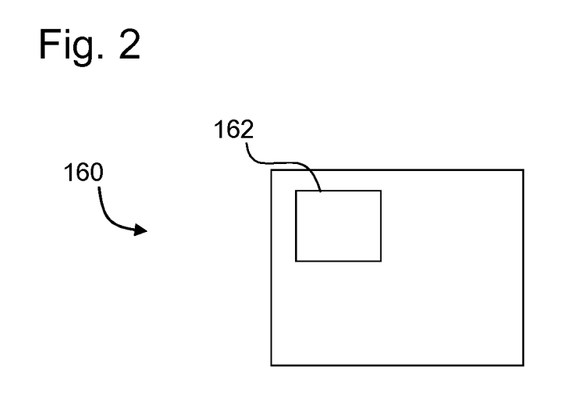
FIG. 2 shows a schematic representation of a GNSS sensor with a computing unit.

The motion and location sensor is preferably a GNSS sensor 160 with a computing unit 162 which executes the method as described above.

The solution proposed here permits, in particular, one or more of the following advantages:

The calculation of a high-precision vehicle location within a motion and location sensor can be carried out even more precisely using the abovementioned additional variables within a Kalman filter.

In this way, the safety in road traffic is increased, since the location of an autonomous vehicle can be determined even more precisely and reliably using the motion and location sensor.

The additional input variables are available in any case within an autonomous vehicle. The inputting of these input data or preprocessed input data into the motion and location sensor can therefore be implemented with an acceptable degree of expenditure.

By virtue of the determination of the weighting factors of a Kalman filter of the motion and location sensor in the Cloud, a motion and location sensor computer can therefore be embodied in a thinner and more favorable fashion.

What is claimed is:

1. A method for satellite-based detection of a vehicle location using a motion and location sensor, the method comprising: receiving, with the motion and location sensor, global navigation satellite system (GNSS) data as an input variable; receiving at least one further input variable; determining weighting factors for the input variable and the at least one further input variable based upon map data; weighting the input variable and the at least one further input variable by the determined weighting factors; calculating the vehicle location using the weighted input variable and the weighted at least one further input variable; and controlling vehicle actuators based upon the calculated vehicle location.

2. The method of claim 1, wherein the at least one further input variable includes one or more of GNSS correction data, data from acceleration and rotational speed sensors, inertial sensor data, wheel speeds, steering angles, vehicle speed, and direction of travel.

3. The method of claim 1, further comprising; performing a predictive weighting process.

4. The method of claim 1, wherein the weighting includes applying a Kalman filter.

5. The method of claim 1, further comprising: receiving the map data prior to determining the weighting factors.

6. The method of claim 1, wherein the map data includes at least one of data of a road map and data of a feature map.

7. The method of claim 1, wherein the map data includes at least one of a position, a size, and a location of further road users within a minimum distance around a vehicle corresponding to the vehicle location to be detected.

8. The method of claim 1, wherein the map data is provided in a pre-processed form.

9. The method of claim 1, wherein the determining of the weighting factors is performed by a central processing device or a superordinate processing device.

10. The method of claim 9, further comprising: transmitting the weighting factors, via a car-to-X communication link, to a vehicle corresponding to the vehicle location to be detected.

11. The method of claim 1, wherein the weighting weighing of the input variable and the at least one further input variable by the determined weighting factors is performed via application of a Kalman filter.

12. The method of claim 1, wherein the calculating detecting of the vehicle location is performed via a weighted neural network.

13. The method of claim 1, wherein the method is performed by executing a computer program.

14. The method of claim 13, wherein the computer program is stored on a machine-readable storage medium.

15. The method of claim 1, wherein the determining, the weighting, and the calculating are performed by a computing unit of the motion and location sensor executing program instructions permanently stored in a memory.

* * * * *

UNITED STATES PATENT AND TRADEMARK OFFICE
CERTIFICATE OF CORRECTION

PATENT NO. : 11,946,746 B2
APPLICATION NO. : 16/401953
DATED : April 2, 2024
INVENTOR(S) : Ewert It is certified that error appears in the above-identified patent and that said Letters Patent is hereby corrected as shown below:

In the Claims

In Claim 11, at Column 12, Lines 5-6: "the weighting weighing" should read --the weighting--.

In Claim 12, at Column 12, Lines 9-10: "the calculating detecting" should read --the calculating--.

Signed and Sealed this
First Day of October, 2024

Katherine Kelly Vidal
*Director of the United States Patent and Trademark Office*